Patented Aug. 7, 1945

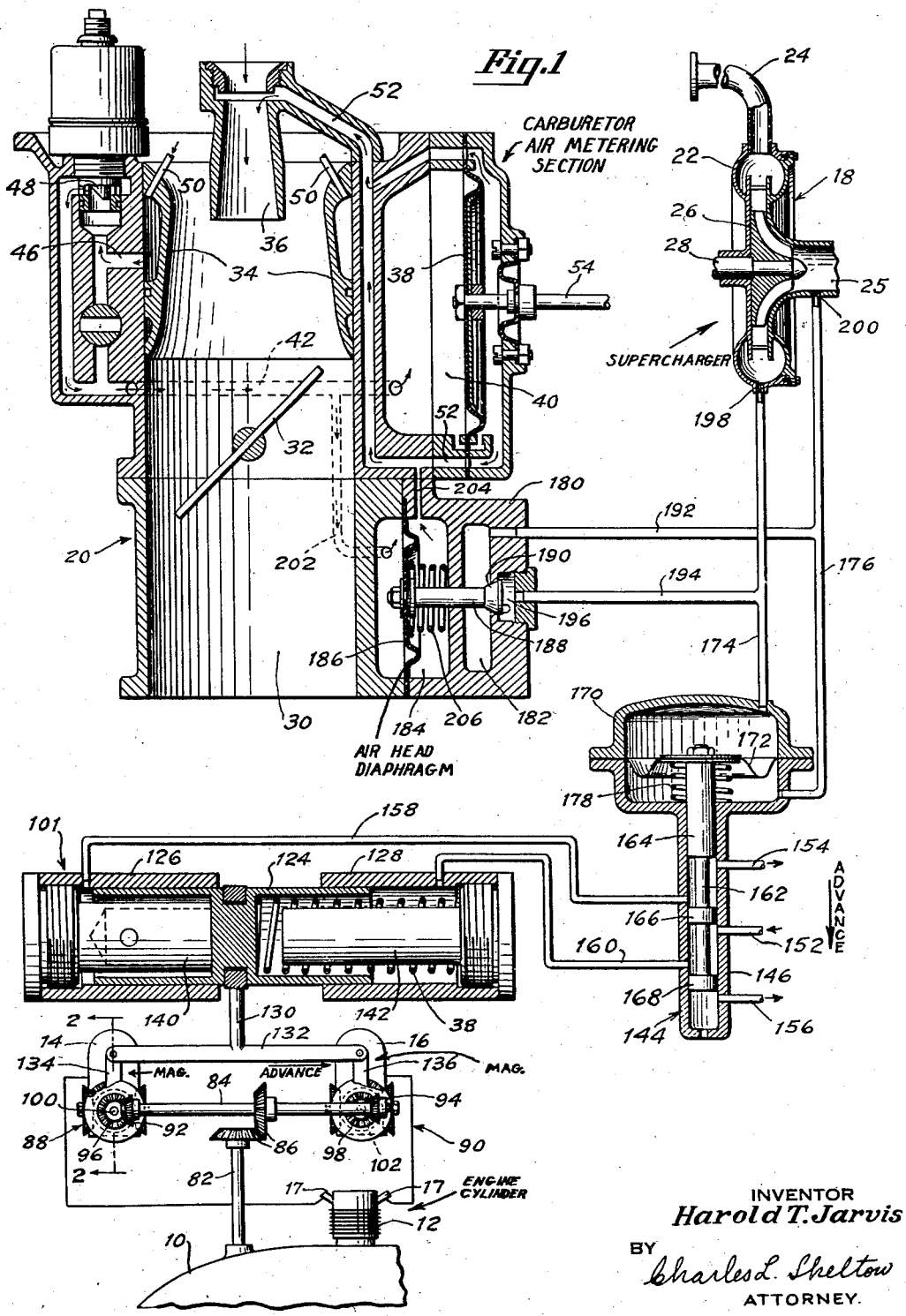

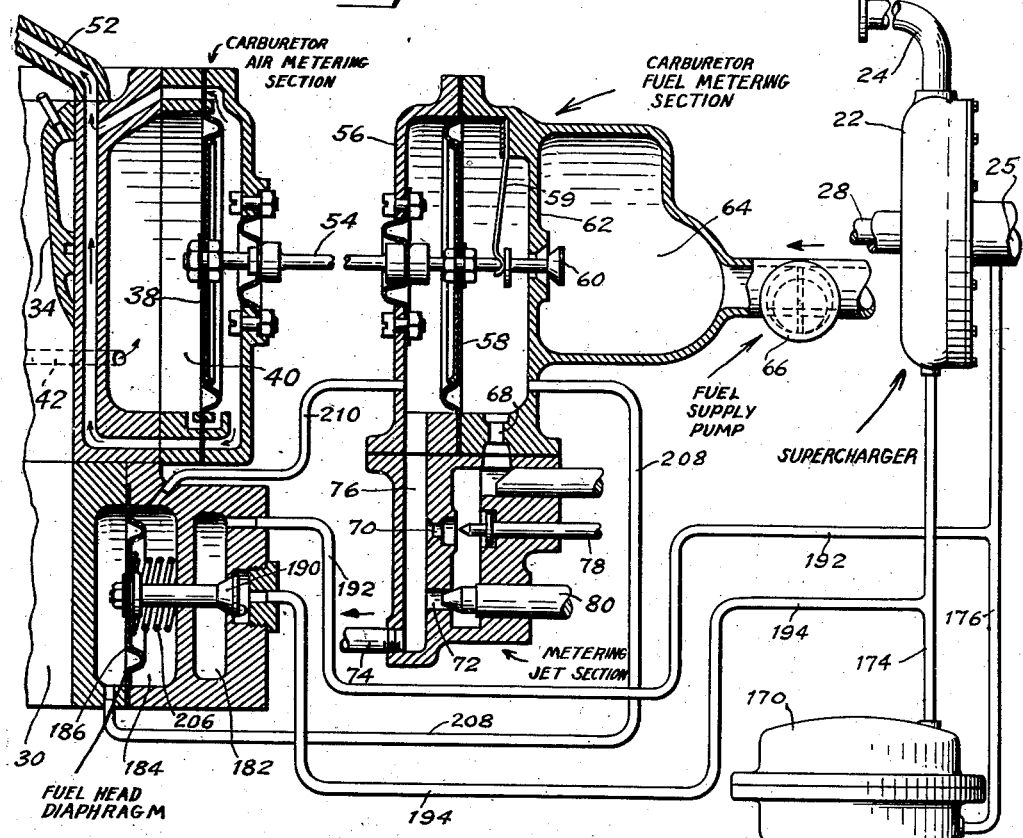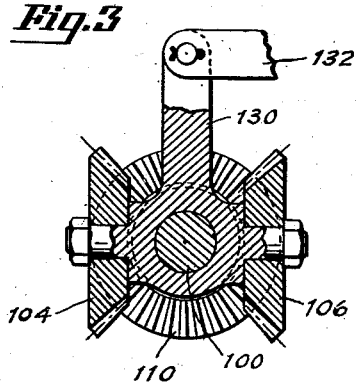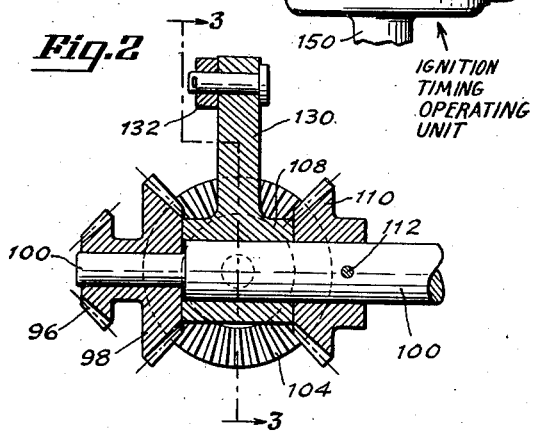

2,380,967

UNITED STATES PATENT OFFICE 2,380,967

IGNITION TIMING

Harold T. Jarvis, Manchester, Conn., assignor to United Aircraft Corporation, East Hartford, Conn., a corporation of Delaware Application March 30, 1943, Serial No. 481,114

6 Claims. (Cl. 123—117)

This invention relates to improvements in internal combustion engines, with particular reference to improved ignition timing control.

An object of the invention is to provide an automatic control including a servo-motor for changing the ignition timing, a device operating the servo-motor control and means operative in response to variations in the rate of intake mass air flow operating the control device.

A further object is to provide a control apparatus in which the control is effected by a device accurately responsive to variations in the rate of intake mass air flow through the carburetor and in which the relatively large pressure rise across the engine supercharger is used as the motivating force.

Other objects and advantages will be apparent from the specification and claims, and from the accompanying drawings which illustrate what is now believed to be a preferred embodiment of the invention.

In the drawings, Fig. 1 is a schematic view of an ignition timing control apparatus constructed according to the invention.

Fig. 2 is a sectional view of one of the magneto drive units taken on the line 2—2 of Fig. 1.

Fig. 3 is a view on line 3—3 of Fig. 2.

Fig. 4 is a diagrammatic view of a portion of the apparatus shown in Fig. 1 showing a somewhat modified form of control apparatus.

Referring to the drawings a supercharged, electric ignition, internal-combustion engine 10 having a plurality of cylinders, one of which is indicated at 12, is provided with ignition apparatus which may include a pair of magnetos 14 and 16 driven by the engine and electrically connected with the engine spark plugs as indicated at 17, with an intake supercharger generally indicated at 18 and with a carburetor, a portion of which is shown in Fig. 1 and generally indicated at 20.

The supercharger has an outer diffuser casing 22 connected with the engine cylinders through a pipe 24, an air intake 25, and an impeller 26 on an engine driven shaft 28. When the engine is operating the pressure rise between intake 25 and discharge casing 22 will increase with the speed of the impeller.

All air entering the engine passes through intake passage 30 of the carburetor, which is conventionally located in the induction passage 25 leading to the supercharger 18. Within this passage is a throttle valve 32 and a Venturi restriction 34. In order to render venturi 34 sensitive to extremely low rates of intake air flow an auxiliary venturi 36 may be installed substantially concentric with restriction 34. A diaphragm 38 is mounted in a chamber 40 adjacent the venturis and the space at one side of the diaphragm is connected with the air passage on the upstream side of the Venturi restriction through channels 42 and 46, the temperature and pressure compensating valve 48 and the ram tubes 50 while the space at the opposite side of diaphragm 38 is connected with the interior of the throat of the auxiliary restriction 36 through the channel 52. With this arrangement, air flowing through intake passage 30 creates a pressure differential across diaphragm 38 and imposes on the stem 54 a force which is a measure of the rate of intake air flow.

The air imposed force on stem 54 is balanced against a fuel imposed force by additional apparatus not shown in Fig. 1 but illustrated in Fig. 4, wherein a chamber 56 contains a diaphragm 58 which is also connected at its center to the stem 54. Stem 54 extends beyond diaphragm 58 and carries a valve 60 which cooperates with a valve seat formed in a wall 62 interposed between the chamber 56 and a chamber 64 into which fuel is pumped by a pump 66. Fuel may flow from chamber 64 past valve 60 into the space in chamber 56 on the valve side of diaphragm 58 and from this space through channel 68, apertures 70 and 72 and conduit 74 to the conventional discharge valve or injection nozzle, not illustrated. The space on the side of the diaphragm 58 opposite valve 60 is connected through channel 76 with apertures 70 and 72. Aperture 70 is controlled by a fuel mixture control valve 78 and aperture 72 is controlled by an economizer valve 80. With this arrangement, fuel flowing from pump 66 to conduit 74 exerts a pressure on diaphragm 58 opposed to the pressure exerted on diaphragm 38 by the pressure differential created by the flow of intake air through the Venturi restriction. When the force exerted by the two diaphragms 38 and 58 and the spring 59 are exactly in balance valve 60 will be in position to correctly meter the fuel flow to maintain a predetermined ratio between the quantity of air and the quantity of fuel in the mixture supplied to the engine.

Magnetos 14 and 16 are driven from the engine by means schematically illustrated in Fig. 1 and comprising an engine driven shaft 82, gears 86, shaft 84 and adjustable gear trains indicated at 88 and 90. Shaft 84 has at its ends bevel gears 92 and 94 which mesh respectively with gears 96 and 98 of the two magneto drive gear trains 88 and 90.

As the two gear trains are similar in all respects, a description of only one of them will be sufficient for the present purpose. Gear 96 is rigidly secured to an oppositely beveled gear 98 (Fig. 2) supported for free rotation on the outer end of magneto drive shaft 100. Gear 98 meshes with a pair of idler gears 104, 106 carried by a cage 108 supported on shaft 100, which is freely rotatable therein. Idler gears 104 and 106 mesh with a drive gear 110 fixed on 100 by pin 112. The drive is therefore from shaft 84 through gears 92 and 96 to gear 98 and thence through idler gears 104 and 106 to gear 110. With this arrangement it is apparent that rotation of cage 108 about shaft 100 will angularly displace gear 110 relative to gear 98, resulting in an angular displacement of shaft 100 relative to engine driven shaft 82, and a consequent change in the timing of the magneto driven by shaft 100.

Rotational movement of the cages of both magneto drive, about the magneto drive shafts, is controlled by a servo device 101 comprising a double ended piston 124 slidable in axially aligned cylinders 126 and 128 and connected with the cages of the magneto gear trains by a yoke 130 and a cross bar 132 pivotally connected at its ends to two arms 134 and 136 extending radially from the idler gear cage 108 of gear trains 88 and 90 so that movement of piston 124 will effect a change in the timing of the magnetos.

Within cylinder 128 is a compression spring 138 which urges piston 124 towards its spark retarding position against the end of a stop 140 in cylinder 126 and telescopically associated with hollow piston 124. A similar stop 142 in cylinder 128 limits the movement of the piston in the spark advancing direction. Stops 140 and 142 are integral with the screw plugs which close the ends of cylinders 126 and 128.

Operation of the servo motor 101 is controlled by the hydraulic valve 144. This valve comprises a hollow casing 146 having at one side thereof spaced ports connected with a pressure line 152 and a pair of drain lines 154 and 156 disposed one at each side of the pressure line 152. The pressure line may be connected with some suitable source of hydraulic fluid under pressure such as the engine lubricating oil pump, not illustrated. The opposite side of the valve casing is provided with spaced valve ports from which fluid conduits 158 and 160 lead to the opposite ends of servo motor 101. As illustrated, conduit 158 leads to the interior of the cylinder 126 adjacent the closed end thereof and the conduit 160 leads to the interior of the cylinder 128 adjacent the closed end thereof. Within the hollow valve casing 146 there is a reciprocable plunger 162 having a pair of reduced portions terminated by spaced piston portions 164, 166 and 168. From the above description, taken in connection with the accompanying drawings, it is apparent that when the plunger 162 occupies its uppermost position, as illustrated in Fig. 1, the conduit 158 is connected with the drain channel 154 and the conduit 160 is connected with the pressure channel 152 thus applying pressure to the right hand end of the piston of the servo motor and moving this piston to its limiting left hand position, as illustrated, thereby retaining the magneto adjustment at a retarded spark position. When plunger 162 occupies its lowermost position, the conduit 158 is connected with the pressure channel 152 thus applying pressure to the left hand side of the piston 124 of the servo motor and moving this piston to its limiting right hand position to advance the magneto spark setting.

At the upper end of valve casing 146 there is a chamber 170 transversely divided by a flexible diaphragm 172 connected at its center to the end of valve plunger 148. The space at the upper side of diaphragm 172 is connected through conduit 174 with the diffuser portion 22 of the supercharger and the space below diaphragm 172 is connected through conduit 176 with the supercharger inlet 25. With this arrangement the pressure rise across the supercharger from the inlet to the outlet will tend to force the diaphragm downwardly and move valve plunger 164 to a position in which it actuates the servo motor 101 to advance the spark setting. The diaphragm is continuously urged toward its upper position, as illustrated, by a calibrated compression spring 178 which is effective to maintain the diaphragm in its upper, spark retarding, position until the pressure rise across the supercharger has reached a certain predetermined value.

A casing 180 is provided adjacent the carburetor and within this casing are two chambers 182 and 184. Within the chamber 184 is a transverse diaphragm 186 connected at its center to a stem 188 which projects through the chamber 182 and carries at its end a valve 190 cooperating with a valve seat provided in the outer wall of chamber 182. A conduit 192 leads from the conduit 176 to the chamber 182 and a conduit 194 leads from the conduit 174 to a pocket 196 provided in the chamber and separated from the chamber 182 by valve 190. With this arrangement, when the valve 190 is opened, the conduits 192 and 194 and consequently the conduits 174 and 176, will be connected through this valve and the pressure differential across the diaphragm 172 will be bled away. In order to facilitate this bleeding operating the conduits 174 and 176 are provided with restricted orifices 198 and 200 each having a cross sectional area less than the free passage through the valve 190.

In the form of the invention shown in Fig. 1, the space within the chamber 184 at the left hand side of the diaphragm 186 is connected by a channel 202 with the interior of the intake air passage 30 and the space at the right hand side of this diaphragm is connected through a channel 204 with the channel 52 leading from the throat of the venturi 36. With this arrangement the Venturi pressure drop will impose a force on diaphragm 72 tending to open valve 190. A calibrated compression spring 206 opposes the force exerted on the diaphragm 186 by the Venturi pressure drop and maintains the diaphragm against movement until the pressure drop has reached a specified value corresponding to a predetermined rate of airflow through the carburetor.

In the form of the invention shown in Fig. 4, the space at the left hand side of the diaphragm 186 is connected through a channel 208 with the space at the right hand side of the fuel flow responsive diaphragm 58 while the space at the right hand side of the diaphragm 186 is connected through a conduit 210 with the space at the left hand side of the fuel flow responsive diaphragm 58. With this arrangement, the pressure exerted by the fuel in flowing to the conduit 74 is exerted on the diaphragm 186 in a direction to open the valve 190. The operation of the diaphragm 186 is exactly the same as that described above in connection with Fig. 1 except that in Fig. 4 the fuel pressure is utilized to open the valve 190 as it has been found that the use of the liquid fuel for this purpose embodies certain advantages, particularly in that the liquid fuel is not compressible and therefore prevents any tendency of the valve 190 to chatter.

Operation

It is desired that the ignition timing should remain retarded during starting and idling operations of the engine, that the spark should be advanced for the cruising range of engine operation and should be again retarded for the full power climbing or take-off range of operations. For the starting and idling range a minimum supercharger rise pressure equivalent to approximately three inches of mercury on a manometer reading has been selected for certain installations, and for the upper limit of the cruising range a carburetor metering pressure indicated by a manometer reading of 17 inches of water has been selected. With the above described apparatus, the compression spring 178 may be calibrated for the starting and idling range so that it will not permit the diaphragm 172 to move until the limiting value of this range is reached. As the supercharger impeller has a relatively slow rate of rotation in the starting and idling range of engine operation it will not exert a supercharger rise pressure differential exceeding that for which the spring 178 is calibrated and therefore spring 178 alone may be depended upon to maintain a retarded spark setting for the starting and idling operation. When the engine speed reaches a value at which the pressure rise across the supercharger exceeds the force of the spring 178 the diaphragm 172 will be moved downwardly thus actuating the servo motor 101 to advance the spark setting of the engine. The diaphragm 186, however, does not respond at these operating conditions and the valve 190 remains closed. If the engine speed and power increased to a value at which the metering pressure exceeds the upper limit of the cruising range, for example seventeen inches of water manometer reading, the diaphragm 186 will be moved to open the valve 190. Opening this valve will interpose a bleed across the conduits 174 and 176 permitting the diaphragm 172 to rise under the force of the spring 178 thus moving the plunger 162 to a position at which the servo motor 101 is actuated to again retard the ignition timing for the high power engine operation.

It is to be understood that the invention is not limited to the specific embodiment herein illustrated and described, but may be used in other ways without departure from its spirit as defined by the following claims.

I claim:

1. In combination with an engine having an adjustable ignition apparatus, an intake air supercharger, and an carburetor having means for establishing a fluid pressure head proportional to the rate of flow of engine intake air, a servo-motor for adjusting said ignition apparatus, means operated by the pressure rise across said supercharger controlling said servo-motor, and means operated by said carburetor pressure head controlling said servo-motor control means.

2. In combination with an engine having an adjustable ignition apparatus, an intake air supercharger, and a carburetor having means for establishing a fluid pressure head proportional to the rate of flow of engine intake air, a servo-motor for adjusting said ignition apparatus, a valve operated by the pressure rise across said supercharger controlling said servo-motor, and a device operated by said carburetor pressure head which renders said supercharger pressure rise ineffective to operate said valve when said carburetor pressure head exceeds a predetermined value.

3. In combination with an engine having an adjustable ignition apparatus, an intake air supercharger, and a carburetor having means for establishing a fluid pressure head proportional to the rate of flow of engine intake air, a servo-motor for adjusting said ignition apparatus, means operated by the pressure rise across said supercharger controlling said servo-motor, and means operated by said carburetor pressure head controlling said servo-motor control means, a valve controlling said servo-motor, a spring urging said valve in an ignition retarding direction, means operated by the pressure rise across said supercharger to move said valve to an ignition advancing position when said pressure rise exceeds a predetermined value, and means operated by said carburetor pressure head to render said pressure rise operated means ineffective to retain said valve in an ignition advancing position when said carburetor pressure head exceeds a predetermined value.

4. In combination with an engine having an adjustable ignition apparatus, an intake air supercharger, and a carburetor having means for establishing a fluid pressure head proportional to the rate of flow of engine intake air, a servo-motor for adjusting said ignition apparatus, means operated by the pressure rise across said supercharger controlling said servo-motor, and means operated by said carburetor pressure head controlling said servo-motor control means, a valve controlling said servo-motor, a spring urging said valve in an ignition retarding direction, means operated by the pressure rise across said supercharger to move said valve to an ignition advancing position when said pressure rise exceeds a predetermined value, a valve operative when open to render said pressure rise operated means ineffective to retain said valve in an ignition advancing position, means actuated by said carburetor pressure head to open said valve, and a spring opposing the valve opening tendency of said pressure head operated means and maintaining said valve closed until said pressure head exceeds a predetermined value.

5. In a device for changing the timing of an engine ignition system, a servo-motor operated by fluid pressure from a first source for moving a time controlling element of said ignition system, a first valve movable by fluid pressure from a second source to reverse said servo-motor by changing the fluid connections between said servo-motor and said first source, and a second valve movable by a third source of fluid pressure to modify the effect of pressure from said second source on said first valve when the pressure from said third source exceeds a predetermined value.

6. In an aircraft engine having an adjustable ignition system, mechanism for adjusting the timing of said ignition system, means for actuating said mechanism in accordance with changes in an engine operating condition, measuring means for establishing a fluid pressure differential which is a measure of the mass rate of flow of intake air to said engine, and means responsive to variations in said fluid pressure differential for modifying the actuation of said mechanism by said actuating means.

HAROLD T. JARVIS.